3,268,483
TWO-STEP PROCESS FOR PREPARING ALKYD
RESINS HAVING IMPROVED PHYSICAL
PROPERTIES
Arie Klootwijk and Robert W. F. Kreps, Amsterdam, Netherlands, assignors to Shell Oil Company, New York, N.Y., a corporation of Delaware
No Drawing. Filed July 15, 1965, Ser. No. 472,298
Claims priority, application Netherlands, July 29, 1960, 254,360
7 Claims. (Cl. 260—75)

This application is a continuation-in-part application of copending application Serial No. 125,087, filed July 19, 1961, now abandoned.

The present invention relates to a novel process for preparing alkyd resins. Particularly, the present invention relates to a novel two-step process for preparing chemical-resistant alkyd resins having unexpectedly improved impact strength and flexibility. More particularly, the present invention relates to a novel two-step process for preparing alkyd resins by reacting esters of alpha-alkyl monocarboxylic acids containing an epoxy group or a plurality of hydroxyl groups in the alcoholic part of the ester molecule with polybasic carboxylic acids or anhydrides thereof.

Specifically, the present invention provides a two-step process for preparing chemical-resistant alkyd resins exhibiting unexpectedly improved impact strength and flexibility which comprises heating and reacting together in a first step (1) a polycarboxylic acid, polycarboxylic acid anhydride or mixtures thereof, (2) polyols having from 2 to 4 hydroxyl groups and from 2 to 6 carbon atoms and optionally and preferably, (3) epoxy-alkyl esters of alpha-alkyl monocarboxylic acids having from 8 to 18 carbon atoms and/or monoglycerides of alpha-alkyl monocarboxylic acids having 8 to 18 carbon atoms, then in a second step, heating and thereby reacting this reaction product with a polycarboxylic acid, polycarboxylic acid anhydride or mixtures thereof and epoxy-alkyl esters of alpha-alkyl monocarboxylic acids having from 8 to 18 carbon atoms.

The usual fusible alkyd resins are of greatly varying types both as regards the alcoholic part of the ester molecule and the monocarboxylic acid modifier from which they are derived. However, the ester linkage represents a weak point and thus reduces its stability. Therefore, although it is possible to utilize a wide variety of fatty acids by incorporating them into the completed alkyd resin, the disadvantage of low stability has been present together with the advantages of desired oil length, increased flexibility and the like. It has been found that increased stability is obtained when alpha-alkyl monocarboxylic acids are utilized and that particularly stable ester linkages are obtained with alpha-alpha-dialkyl monocarboxylic acids.

It has also been found that epoxy-alkyl esters of alpha-alkyl monocarboxylic acids are particularly suitable because of improved reaction control whereby undesirable side reactions are minimized. Such resins and a single-step process for making such resins are more fully described in copending United States patent application Serial No. 29,165, filed May 16, 1960, by Nantko Kloos. The alkyd resins produced by such a one-step process have excellent chemical resistance but do not have the required flexibility and impact strength for some applications. Accordingly, the present two-step process is directed to an improvement over the one-step process, i.e., the present two-step process provides alkyd resins which not only have excellent chemical resistance but also exhibit improved mechanical properties such as hardness, impact strength and flexibility.

Alkyd resins prepared by the single-step process exhibit impact strengths generally in the order of from 1 to 3 lb./in. and a poor flexibility, i.e., failure at ¼ in. (measured by the presence of cracks in a lacquer film when bending an enamelled metal panel around a mandrel of various diameters of ¼, ⅛ and 1/16 inch). On the other hand, alkyd resins prepared by the instant two-step process exhibit impact strengths of 10 to 20 lb./in. and upwards and an excellent flexibility as evidenced by no cracks when an enamelled panel is bent around a 1/16 inch diameter mandrel.

As indicated above, the alkyd resin contains three different groups of monomers or starting components. For the sake of convenience, these monomers are classified into three categories and will be often referred to herein according to this classification.

The first category comprises a member of the class consisting of polycarboxylic acids and polycarboxylic anhydrides. The second category comprises polyols having from 2 to 4 hydroxyl groups and from 2 to 6 carbon atoms. The third category comprises a member of the class consisting of epoxy-alkyl esters of alpha-alkyl monocarboxylic acids having from 8 to 18 carbon atoms and monoglycerides of alpha-alkyl monocarboxylic acids having from 8 to 18 carbon atoms.

Briefly speaking, the alkyd resin which is characterized by improved mechanical properties as well as excellent chemical resistance is obtained by a two-step process for preparing alkyd resins from a reaction mixture containing (1) a member of the class consisting of polybasic carboxylic acids and polybasic carboxylic acid anhydrides, (2) a member of the class consisting of epoxy alkyl esters of alpha-alkyl monocarboxylic acids and monoglycerides of alpha-alkyl monocarboxylic acids, and (3) at least one polyol, comprising reacting the above groups of monomers in such a way that the equivalent weight ratio of group (2) to group (3) present in the reaction mixture is increased by addition of further monomers during the polymerization reaction, the final average equivalent ratio being between 0.2 and 20.

As known in the alkyd resin art, the terms equivalent and equivalent weight have reference to the chemical combining power into an ester group of an alcoholic group and a carboxylic acid group. In those cases in which the functional group of the starting component is in the anhydride form as is the situation, for example, of phthalic anhydride and of glycidyl esters of alpha-alkyl monocarboxylic acids, due consideration is made that either of these anhydride compounds contains in effect two reactive groups per molecule. Thus, the equivalent weight of phthalic anhydride is 74.

Unless otherwise indicated, all percentages and proportions used herein are to be construed on a weight basis.

In this specification the final average value is defined as the ultimate ratio in which the starting materials are incorporated in the reaction mixture, as distinct from the limiting value of an alkyd resin.

By carrying out the reaction in the above-described two-step manner, a very particular and controllable distribution of the various structural elements over the resin molecule is ensured which is entirely different from the distribution in resins obtained by the prior one-step processes. This structural distribution provides the improved mechanical properties obtained by the present two-step process.

The total quatity of polycarboxylic acid or anhydride (first category) required may be incorporated in the reaction mixture even at the beginning, although a portion is preferably added in the second stage. The quantity of polyol (second category) which may or may ot be added in the second stage or step is generally small compared to the quantities of epoxyalkyl esters of alpha-alkyl monocarboxylic acids (third category) which are added in the second step. In general, the final value to which the ratio of the quantity of compounds of the third category (expressed in equivalents) incorporated in the reaction mixture to the quantity of compounds of the second category (expressed in equivalents) incorporated in the reaction mixture is increased to between 0.4 and 4.

Most favorable results are obtained by adding at least 60% of the said equivalents of compounds of the third category to the reaction mixture in a second step after at least 80% of the said equivalents of the compounds of the second category has reacted in the first step.

The results are particularly favorable when at least 70% of the said equivalents of compound of the third category is added to the reaction mixture in a second step after at least 90% of the said equivalent of compounds of the second category has reacted in the first step.

The relative proportions of the reactants of the present process may be stated for convenience on a molar basis. Thus, favorable results are obtained when the molar ratio in the first step of polycarboxylic compound (first category):polyol (second category):epoxy ester of alpha-alkyl monocarboxylic acid (third category) is in the range from about 1.0:1.0:0.1 to about 1.0:1.5:0.5.

As noted hereinbefore, it is sometimes desirable to add all of the epoxy-alkyl esters of the monocarboxylic acid in the second step. In such instances, of course, the molar ratio of polycarboxylic compound:polyol:epoxy esters of alpha-alkyl monocarboxylic acids will range in the first step from 1.0:1.0:0.0 to about 1.0:1.5:0.0.

This resulting resin is then reacted in a second step. Although a small quantity of polyol may be added in the second step as hereinbefore noted, generally all the polyol is added in the first step. Accordingly, the molar ratio of polycarboxylic compound to the epoxy-alkyl esters of alpha-alkyl monocarboxylic acid in the second step may range from about 1.0:0.8 to 1.0:1.2 and is preferably an equimolar ratio, i.e., 1.0:1.0.

The molar ratio of components in the final resins may vary somewhat depending of course upon the relative amounts of components added in the respective first and second steps; however, the molar ratio of polycarboxylic compound (first category):polyol (second category): epoxy esters of alpha-alkyl monocarboxylic acids (third category) may preferably range from about 1.0:0.5:0.8 to about 1.0:0.2:0.4.

A special alkyd resin having outstanding chemical resistance, impact strength and flexibility is prepared by the two-step process which comprises a first step of mixing and reacting at 190° C. to 250° C., phthalic anhydride with glycerol in a mole ratio of about 1.0:1.3, then in a second step, mixing and reacting the resulting first step resin at 130° C. to 270° C. with an approximate equimolar ratio of phthalic anhydride and glycidyl esters of saturated aliphatic alpha-alkyl monocarboxylic acids, said acids containing from 8 to 18 carbon atoms and preferably from 9 to 11 carbon atoms in the molecule, the molar ratio of phthalic anhydride:glycerol:glycidyl esters in the final alkyd resin product being about 1.0:0.325: 0.75.

Examples of suitable polycarboxylic compounds (first category) include dibasic carboxylic acids, such as succinic acid, xylyl succinic acid, alkyl or alkenyl succinic acids, adipic acid, sebacic acid, maleic acid, fumaric acid, phthalic acid, isophthalic acid, terephthalic acid, tetrahydrophthalic acid, diglycollic acid, dimerized fatty acids of drying oils, and Diels-Alder adducts of maleic acid with dienes, such as terpenes and cyclopentadiene, as well as polybasic acids, such as trimellitic acid, pyromellitic acid, citric acid, and aconitic acid. Dibasic carboxylic acids are preferred. If desired, two or more of these polycarboxylic acids may be used together. If possible these polycarboxylic acids are preferably used in the form of their anhydrides and the text generally stated in this specification and claims with respect to polycarboxylic acids also applies to the anhydrides thereof.

Examples of suitable polyols (second category) include the aliphatic polyhydroxy compounds having 2 to 4 hydroxyl groups and 2 to 6 carbon atoms, such as ethylene glycol, propylene glycol, glycerol, pentaerythritol, trimethylol propane and 1,2,6-hexanetriol. Likewise, two or more compounds of this category may be used together if desired. It is particularly advisable to use a combination of di- and trivalent compounds of this category.

Examples of suitable monomers of the third category include the monoglycerides of alpha-alkyl monocarboxylic acids as disclosed and claimed in copending United States patent application Serial No. 28,865, filed May 13, 1960, by Nankto Kloos and Jacques J. J. Drost, now U.S. Patent 3,178,454, issued April 13, 1965.

The monocarboxylic acids used to make the epoxy esters of monoglycerides of the third category are generally aliphatic monocarboxylic acids, particularly those having at least 8 and not more than 20 carbon atoms in the molecule. Cycloaliphatic or aromatic monocarboxylic acids may also be used. The important characteristic is that the acids have secondary or tertiary carboxyl groups.

Preferably, these acids are obtained by reacting olefins having at least 7 carbon atoms in the molecule with carbon monoxide and water. This reaction takes place under the influence of acid catalysts, for example, phosphoric acid, sulfuric acid, and complexes of phosphoric acid with boron fluoride. The reaction is more thoroughly described in the patent application of Marinus J. Waale and Johan M. Vox, Serial No. 858,609, filed December 10, 1959; now U.S. 3,059,004, issued October 16, 1962. As indicated in this patent, the carboxyl group adds on at the double bond and even when the double bond is terminal, the addition is such, that there is a strong tendency for tertiary groups to be formed by isomerization. Branching at the double bond also provides a tertiary carboxyl group. Very attractive products are obtained when monoolefins having at least 8 and not more than 18 carbon atoms in the molecule are thus converted into monocarboxylic acids and subsequently via the epoxy-alkyl esters of these acids into alkyd resins. Preferably, more than 10% of the monocarboxylic acids will be tertiary in the carboxyl group.

The vic-epoxy-alkyl esters of the above monocarboxylic acids may be prepared in any of the known ways for obtaining epoxy esters from monocarboxylic acids. A preferred method for preparing such esters in set forth in the copending United States patent application Serial No. 28,865, filed May 13, 1960, by Nantko Kloos and Jacques J. J. Drost, now U.S. Patent 3,178,454, issued April 13, 1965.

Briefly speaking, a monocarboxylic acid salt (for example, alkali metal salts or quaternary ammonium salts) may be reacted with epichlorohydrin. This reaction is preferably carried out by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acids may be reacted as such with epichlorohydrin with the use of nitrogen bases or salts thereof as catalysts. When monocarboxylic acids and epichlorohydrin are used in a stoichiometric ratio, or when an excess of carboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case, the preferred catalysts are tertiary amines and quaternary ammonium salts.

Monocarboxylic acids salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

The epoxy esters which are preferably used in the present invention may be characterized by the following formula:

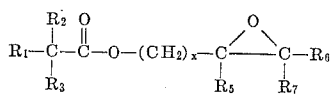

in which $R_1$ and $R_2$ are alkyl groups, $R_3$, $R_5$, $R_6$ and $R_7$ are members of the class consisting of hydrogen and alkyl groups, the groups $R_1$, $R_2$ and $R_3$ contain a sum total of from 3 to 18 carbon atoms, $R_5$, $R_6$ and $R_7$ contain a total of from 0 to 18 carbon atoms and $x$ is an integer from 0 to 6.

In general, the alcoholic part of the ester molecule may be any one of the group fitting within the formula defined above although preferably the epoxy-alkyl group contains 3 to 6 carbon atoms. Most preferably $x$ is 1 so that a 2,3-epoxy radical is utilized such as 2,3-epoxy butyl, 2,3-epoxy hexyl, 2,3-epoxy-4-phenyl octyl, 2-ethyl-2,3-epoxy hexyl, 2,3-epoxy-4,5-diethyl docecyl and epoxy cyclohexyl. The nature of the carbon skeleton of the epoxy-alkyl group affects the properties of the alkyd resins. Long carbon chains, for example, increase the flexibility of these resins. Most preferred, however, are the glycidyl esters.

The reaction of the monomers of the three categories is generally carried out at temperatures in the range of from 130° C. to 270° C. When water is formed during the reaction a temperature in the range of from 190° C. to 250° C. is preferred. In general, therefore, the temperatures employed during the first step ranges from about 190° C. to 250° C., and the second step is performed at about 130° C. to 270° C.

An organic solvent such as xylene may be added to the reaction mixture. The water formed by the condensation may be readily removed by azeotropic distillation with the aid of xylene.

Catalysts usually employed for esterification reactions may also be advantageously added, such as sulfuric acid, benzene-sulfonic acid, paratolyl sulfonic acid, or the chlorides of magnesium, aluminum or zinc. As a result of the higher reaction rate the reaction may be carried out at a lower temperature, for instance, 200° C. The lower temperature has a favorable effect on the color of the resins.

To ensure that the alkyd resins have the lightest possible color, it is advisable to carry out the reaction in an oxygen-free atmosphere.

The resins produced according to the invention are very suitable for use in paints, lacquers and varnishes, and particularly for use in stoving enamels. They may be worked up by the conventional methods with pigments, diluents, phenol-formaldehyde resins, urea-formaldehyde resins, melamine-formaldhyde resins, thickeners and other usual components. Coatings formulated with these alkyd resins have outstanding hardness, excellent flexibility, impact strength and adhesion and have outstanding resistance to chemicals. The resins have a light color and are therefore very suitable for the manufacture of white and light-colored paints and lacquers.

The invention will be illustrated in detail by some examples. The parts are parts by weight. The viscosity is determined in a 50% solution in xylene. The color is measured by comparison with the color of a 50% solution of the resin in xylene according to the Gardner scale. The hardness was determined according to Buchholz; the impact strength according to the British Standard Method; the flexibility by bending an enamelled metal panel around a mandrel which successively had a diameter of ¼, ⅛ and ¹⁄₁₆ inch and establishing the presence of cracks in the lacquer film. The Erichson penetration was determined by slowly pressing a metal ball in an enamelled metal panel which was supported on all sides around the point of impact by a ring, and determining the distance in millimeters over which this ball could be pressed into the panel before cracks developed in the lacquer film. The gloss was measured by comparison with a black plate-glass panel.

The resistance to chemical was assessed by exposing a lacquer film at 25° C. for 7 days to the action of a sodium hydroxide solution of 5% concentration and of the vapors of acetic acid solution of 5% concentration. The rating 0 means that the film was entirely destroyed and the rating 10 means that it was not attacked.

*Example I*

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into mono-olefins by partial hydrogenation. The alkenes were substantially unbranched. The double bonds were present almost exclusively between non-terminal carbon atoms.

The alkenes were converted with carbon monoxide and water into carboxylic acids, the temperature being 60° C., the carbon monoxide pressure 100 atmosphere, a catalyst being used containing $H_3PO_4$ and $BF_3$ in equimolar quantities. The crude carboxylic acids were neutralized with sodium hydroxide after being separated from the catalyst, whereupon the aqueous sodium salt solution was freed from the hydrocarbons still present by finally extracting it with gasoline.

The sodium salt solution was gradually added to a tenfold molar quantity of epichlorohydrin, the mixture being maintained at the boiling point and water removed by azeotropic distillation. In this way, glycidyl ester of alphaalkyl monocarboxylic acids having 9 to 11 carbon atoms were obtained (average molecular weight was 243).

A mixture of

| | Mole ratio |
|---|---|
| 222 g. (1.50 moles) of phthalic anhydride | 1.00 |
| 128 g. (1.39 moles) of glycerol | 0.93 |
| 50 g. of xylene. | |
| 124 g. (0.51 mole) of glycidyl esters of monocarboxylic acids branched at the alpha position ($C_9$–$C_{11}$) | 0.34 | was kept for 6 hours at 240° C. in a nitrogen atmosphere while it was stirred. The water formed was continuously removed by azeotropic distillation. After the mixture was cooled to 150° C. there was added:

809 g. (3.34 moles) of the said glycidyl esters
491 g. (3.32 moles) of phthalic anhydride The mixture was kept for a further 4 hours at 150° C. The resultant resin had an acid number of 5.4, a Gardner color of 3 and a viscosity of 53 cs. The molar ratio of phthalic anhydride:glycerol:glycidyl esters was approximately 1.0:0.3:0.8 in the final resin.

A stoving enamel produced from 70 parts of this resin, 30 parts of urea-formaldehyde resin and 90 parts of titanium white was applied to thin steel panels and baked at 150° C. for 40 minutes.

On testing the resultant films the following results were obtained:

Hardness (Buchholz) _____ 95.
Flexibility, bend-testing around
   a mandrel having a diameter of ____ 1/16 inch.
Impact strength _____ 16 lb./inch.
Erichson penetration _____ 8.5 mm.
Resistance to NaOH _____ 9.
Resistance to acetic acid (vapor) ____ 8.
After heating for ½ hour to 200° C. ___ Very slight discoloration.
Gloss _____ 90%.

On testing a stoving enamel prepared from 75 parts of this resin, 25 parts of melamine-formaldehyde resin and 90 parts of titanium white and baked on thin steel panels for 40 minutes at 150° C., the following results were obtained:

Hardness (Buchholz) _____ 100.
Flexibility, bend-testing around
   a mandrel having a diameter of _____ 1/16 inch.
Impact strength _____ 20 lb./inch.
Erichson penetration _____ 7 mm.
Resistance to NaOH _____ 9.
Resistance to acetic acid (vapor) _____ 8.
Gloss _____ 90%.

Example II

A mixture of 148 g. (1.0 mole) of phthalic anhydride
105 g. (0.7 mole) of triethylene glycol
40.8 g. (0.3 mole) of pentaerythritol
30 g. of xylene was kept for 4 hours in a nitrogen atmosphere at 240° C. while it was stirred. The water formed was continuously removed. After the mixture was cooled to 150° C., 148 g. (1.0 mole) of phthalic anhydride and 243 g. (1.0 mole) of glycidyl esters of monocarboxylic acids branched at the alpha position ($C_9$–$C_{11}$) were added. The mixture was then kept at 150° C. for a further 2 hours. The resultant resin had an acid number of 15.7, a viscosity of 126 cs. and a Gardner color of 1. The molar ratio of phthalic anhydride:golyols:glycidyl esters was approximately 1.0:0.5:0.5 in the final alkyd resin.

A stoving enamel produced from 70 parts of this resin, 30 parts of urea-formaldehyde resin and 90 parts of titanium white was applied to thin steel panels and baked at 150° C. for 40 minutes.

On testing the resultant films, the following results were obtained:

Hardness (Buchholz) _____ 118.
Flexibility, bend-testing around a
   mandrel having a diameter of _____ 1/16 inch.
Impact strength _____ 9 lb./inch.
Erichson penetration _____ 6.2 mm.

Example III

A mixture of 115.5 g. (0.78 mole) of phthalic anhydride
105 g. (0.72 mole) of adipic acid
128 g. (1.39 moles) of glycerol
124 g. (0.51 mole) of glycidyl esters of monocarboxylic acids branched at the alhpa position ($C_9$–$C_{11}$)
50 g. of xylene was kept for 4 hours in a nitrogen atmosphere at 240° C. while it was stirred and the water formed was continuously removed. After the mixture was cooled to 150° C., 492 g. (3.33 moles) of phthalic anhydride and 809 g. (3.33 moles) of the said glycidyl esters were added and the mixture was subsequently kept at 150° C. for 2½ hours. The resultant resin had an acid number of 6.2, a viscosity of 71 cs. (centistokes) and a Gardner color of 2. The molar ratio of polycarboxylic compounds:glycerol:glycidyl esters in the final alkyd resin was approximately 1.0:0.3:0.8.

A stoving enamel produced from 70 parts of this resin, 30 parts of urea-formaldehyde resin and 90 parts of titanium white was applied to thin steel panels and baked at 150° C. for 40 minutes.

On testing the following results were obtained:

Hardness (Buchholz) _____ 77.
Flexibility, bend-testing around a mandrel
   having a diameter of _____ 1/16 inch.
Impact strength _____ 90 lb./in.
Erichson penetration _____ 9 mm.
Resistance to NaOH _____ 7.
Resistance to acetic acid (vapor) _____ 9.
After heating for ½ hour to 200° C. _____ Slight discoloration.

Example IV

A mixture of 222 g. (1.50 moles) of phthalic anhydride
148 g. (1.16 moles) of glycerol
124 g. (0.51 mole) of glycidyl esters of monocarboxylic acids branched at the alpha position ($C_9$–$C_{11}$)
50 g. of xylene
55 mg. of para-tolyl sulphonic acid was heated to 230° C. for 1 hour while it was stirred and water formed was continuously removed. After the mixture was cooled to 150° C., 492 g. (3.33 moles) of phthalic anhydride and 809 g. (3.33 moles) of the said glycidyl esters were added. After the resin had been kept at 150° C. for 3 hours it had an acid number of 5.7, a viscosity of 64 cs. and a Gardner color of 3. The molar ratio of anhydride:glycerol:glycidyl esters was 1.0:0.3:0.8 in the final alkyd resin.

A stoving enamel produced from 70 parts of this resin 30 parts of urea-formaldehyde resin and 90 parts of titanium white was applied to thin steel panels and baked at 150° C. for 40 minutes.

On testing the resultant films the following results were obtained:

Hardness (Buchholz) _____ 87.
Flexibility, bend-testing around a mandrel
   having a diameter of _____ 1/16 inch.
Impact strength _____ 20 lb./in.
Erichson penetration _____ 9 mm.
Resistance to NaOH _____ 8.
Resistance to acetic acid (vapor) _____ 9.
After heating for ½ hour to 200° C._____ Slight discoloration

Example V

This example illustrates the superiority of the present two-step process over the conventional one-step process.

A mixture of 740 g. (5.0 moles) of phthalic anhydride
600 g. (6.52 moles) of glycerol
130 g. of xylene was kept for 7 hours in a nitrogen atmosphere at 200–240° C., while it was stirred. The mole ratio of phthalic anhydride to glycerol in the first step was 1.0 to 1.3. The water formed was continuously removed. After the mixture was cooled to 150° C., 1700 g. (11.5 moles) of phthalic anhydride and 2780 g. (11.5 moles) of glycidyl esters of monocarboxylic acids branched at the alpha position were added (equimolar ratio). The mixture was then kept at 150° C. for a further 3½ hours. The resultant resin (herein called the two-step resin) had an acid number of 5.4, a viscosity of 49.5 cs. and a Gardner color of less than 1. The molar ratio of phthalic anhydride:glycerol:glycidyl esters in final alkyd resin was 1.00:0.325:0.75.

A stoving enamel produced from 60 parts of this resin, 40 parts of urea-formaldehyde resin and 90 parts of titanium white was applied to thin steel panels and baked at 150° C. for 40 minutes.

A second resin was prepared by mixing and reacting in a single step a mixture of:

2440 g. (16.5 moles) of phthalic anhydride
600 g. (6.52 moles) of glycerol
2780 g. (11.5 moles) of glycidyl esters of alpha-branched monocarboxylic acids ($C_9$–$C_{11}$)
130 g. xlyene at 150° C. for about 10 hours in a nitrogen atmosphere with stirring. The molar ratio of phthalic anhydride:glycerol:glycidyl esters in the final one-step resin was 1.00:0.325:0.75.

A stoving enamel produced from 60 parts of this resin, 40 parts of urea-formaldehyde resin and 90 parts of titanium white was applied to thin steel panels and baked at 150° C. for 40 minutes.

The resulting films prepared from the one-step and two-step processes were evaluated and are tabulated below:

|  | Two-Step Process | One-Step Process |
|---|---|---|
| Hardness (Buchholz) | 111 | 74. |
| Flexibility, bend-testing around a mandrel having a diameter of | 1/16 inch | 1/4 inch. |
| Impact strength | 16 lb./in | 5 lb./in. |
| Erichson penetration | 5.4 mm | 5.0 mm. |
| Resistance to NaOH | 9 | 8. |
| After heating for 1/2 hour to 200° C | Very slight discoloration. | Slight discoloration. |
| Gloss | 75% |  |

It will be seen that the hardness, flexibility and impact strength of the two-step resin is superior to that of the one-step resin.

We claim as our invention:

1. A two-step process for preparing alkyd resins which comprises a first step of mixing and reacting (1) polycarboxylic compounds of the class consisting of polycarboxylic acids and polycarboxylic acid anhydrides, (2) at least one polyol having from 2 to 4 hydroxyl groups and from 2 to 6 carbon atoms and (3) epoxy-alkyl esters of alpha-alkyl monocarboxylic acids having from 8 to 18 carbon atoms in the acid portion, the mole ratio of (1):(2):(3) being the range of from 1.0:1.0:0.1 to 1.0:1.5:0.5, then in a second step, reacting the first step reaction product with a polycarboxylic compound of (1) and an epoxy alkyl ester of (3) in the range of from about 1.0:0.8 to 1.0:1.2, respectively, said reaction steps being carried out at a temperature from 130° C. to 270° C., and the final alkyd resin having a molar ratio of (1):(2):(3) in the range of 1.0:0.5:0.8 to 1.0:0.2:0.4.

2. A two-step process as in claim 1 wherein the polycarboxylic compound is phthalic anhydride 3. A two-step process as in claim 1 wherein the polycarboxylic compound consists essentially of phthalic anhydride and adipic acid.

4. A two-step process as in claim 1 wherein the polyol is glycerine.

5. A two-step process for preparing alkyd resins which comprises a first step of mixing and reacting (1) a polycarboxylic compound of the class consisting of polycarboxylic acids and polycarboxylic acid anhydrides and (2) at least one polyol having from 2 to 4 hydroxy groups and from 2 to 6 carbon atoms, the mole ratio of (1) to (2) being in the range of about 1.0:1.5, then, in a second step, reacting the first step reaction product with a polycarboxylic compound of (1) with (3) epoxy alkyl esters of alpha-branched monocarboxylic acids having from 8 to 18 carbon atoms, the mole ratio of (1) to (3) in said second step being in the range from about 1.0:0.8 to 1.0:1.2, said reaction steps being carried out at a temperature from about 130° C. to 270° C. and the final alkyd resin having a molar ratio of (1):(2):(3) in the range of 1.0:0.5:0.8 to 1.0:0.2:0.4.

6. A two-step process as in claim 5 wherein the polyol is a mixture of trithylene glycol and pentaerythritol.

7. A two-step process for preparing alkyd resins which comprises a first step of mixing and reacting at a temperature from about 190° C. to 250° C., phthalic anhydride with glycerol in the mole ratio of about 1.0:1.3, then in a second step mixing and reacting the resulting first step product at a temperature from about 130° C. to 270° C. with an equimolar ratio of phthalic anhydride and glycidyl esters of saturated alpha-alkyl monocarboxylic acids, said acids containing from 9 to 11 carbon atoms in the molecule, the molar ratio of phathalic anhydride:glycerol:glycidyl esters of saturated alpha-alkyl monocarboxylic acids in the final resin product being about 1.0:0.325:0.75.

References Cited by the Examiner

UNITED STATES PATENTS

| 2,682,514 | 6/1954 | Newey | 260—75 |
| 3,142,686 | 7/1964 | Kreps et al. | 260—348 |
| 3,161,618 | 12/1964 | Kreps et al. | 260—75 |

FOREIGN PATENTS

| 1,267,187 | 6/1961 | France. |
| 110,783 | 4/1961 | Pakistan. |

WILLIAM H. SHORT, *Primary Examiner.*

L. P. QUAST, *Assistant Examiner.*